Patented Aug. 6, 1946

2,405,408

UNITED STATES PATENT OFFICE 2,405,408

PREPARATION OF SYNTHETIC GELS

Gerald C. Connolly, Baton Rouge, La., assignor to Standard Oil Development Company, a corporation of Delaware No Drawing. Application September 12, 1942, Serial No. 458,140

7 Claims. (Cl. 196—52)

This invention relates to the preparation of synthetic oxide gels adapted for use as catalytic agents and forms a continuation-in-part of my application Serial No. 233,159, filed October 4, 1938, now Patent No. 2,356,303, dated August 22, 1944.

In my earlier application just mentioned I have pointed out that synthetic silica-alumina gels of exceptionally high activity for the catalytic conversion of oils and particularly for the cracking of oils may be prepared by combining alumina or a salt convertible into alumina, with a hydrous oxide of silicon, such as silica hydrosol, silica hydrogel or gelatinous precipitates of silica and mixtures thereof, in which the silica contains a substantial amount of imbibed water at the time of mixing the alumina or the aluminum salt solution therewith. My earlier application also describes various procedural methods of combining different forms of alumina and aluminum salts with the silica hydrogel. All of these procedural methods, however, are characterized by the fact that the alumina or the aluminum salt solution is combined with the silica while the latter is in a hydrous state.

While I have prepared many highly active cracking catalysts according to the general procedural methods outlined in said application, I have found that in some cases difficulty is experienced in reproducing the same results when preparing different batches of the gel according to the same general procedure. This is particularly true when preparing gels in large quantities in commercial plants wherein the variables present during the preparation of the gels cannot be as carefully controlled as in smaller scale laboratory equipment. Expressed in another way, the different batches of gel produced by the same procedure many times show substantial fluctuation in catalyst activity or other properties which in turn causes a fluctuation in the results obtained when using a gel catalyst for the intended purpose. This is an obvious disadvantage since it is important to have a catalyst of uniform activity.

The principal object of the present invention is to provide a method of making synthetic oxide gel catalysts which have an extremely high level of activity, even when produced in large-scale commercial units.

Other objects and advantages of the invention will be apparent from the more detailed description hereinafter.

In accordance with the present invention, a silica hydrosol is first formed which upon standing is capable of setting into a firm jelly-like mass or hydrogel. After the hydrosol is formed and before it finally sets into a jelly, I impregnate or add to the hydrosol a salt of a metal, the oxide of which is to form one of the final components of the catalyst. The invention is particularly adapted for producing silica-alumina gels, although it may be used in preparing other types of mixed gels or gels containing components other than alumina.

When preparing the silica-alumina gels, for example, an aluminum salt or an aluminum salt solution is added to the hydrosol after formation and before the hydrosol sets into a permanent jelly-like mass. By adding the aluminum salt after the formation of the hydrosol rather than during its formation, as when preparing a plural gel, I avoid the possibility of forming three-component zeolitic compounds containing soda, alumina and silica which may form when combining an alkali silicate with an aluminum salt, unless the conditions are carefully controlled during the mixing. This means that I can obtain by simple washing a finished product virtually free of soda whereas if any zeolite is formed, considerable soda is usually left that can only be removed by special processing. Furthermore, by adding the salt to the hydrosol rather than after the jelly has been formed, a more thorough intermixing of the aluminum salt with the colloidal silica present in the hydrosol may be obtained, thus insuring a more uniform product.

The silica hydrosol employed as the initial material in the preparation of the catalyst, as later described, may be prepared by reacting an acid with an alkali metal silicate according to conventional methods well known in the art. When preparing a silica hydrosol from an alkali silicate, it is important to control the concentration of the reaction solutions of acid and silicate to avoid immediate precipitation of the silica and to maintain at all times a slight excess of acid throughout the mixing. For example, when employing hydrochloric acid as a reactant, a 10% hydrochloric acid solution may be employed with a waterglass solution having a specific gravity between 1.1 and 1.3. The waterglass is preferably added to the acid solution, or a stream of waterglass solution and acid may be caused to mix simultaneously so as to provide rapid mixing and thus prevent any localized excess of alkali during the mixing thereof. The resulting mixture is preferably slightly acid but in most cases it is desirable to maintain a relatively low excess of acid, such as about 0.4 excess normality. This increases somewhat the amount of time required for setting of the hydrogel at any given temperature but at the same time reduces the amount of washing and neutralizing treatment later employed.

Under properly controlled conditions a clear colloidal solution of silicic acid forms as a result of the reaction between the acid and the sodium silicate which upon standing is capable of setting into a firm jelly or hydrogel.

As previously described, the salt of a metal, the oxide of which is to form the final component of the catalyst, is added to the hydrosol in an amount sufficient to produce a product having a desired percentage of the metal oxide contained therein. In cases where it is desired to produce a catalyst having two or more metal oxide components in addition to silica, the salts of the various metals to be converted to the oxide may be added to the silica hydrosol, as previously described.

After addition of the salt to the hydrosol, the resulting solution is preferably heated to a temperature of about 150° F. and then allowed to stand until syneresis is fully developed. By heating the impregnated hydrosol the time required to convert it into the hydrogel state may be materially shortened.

According to one method of procedure, the hydrogel or jelly so formed is broken up into lumps and then treated with a precipitating agent capable of converting the salt into the corresponding oxide. Such a precipitating agent may comprise a volatile hydroxide such as ammonium hydroxide. The amount of ammonium hydroxide or other precipitating agent employed is usually not more than that theoretically required to neutralize the excess acidity and to convert all of the salt into the oxide and is preferably somewhat less than the theoretical amount. Particularly desirable results are obtained, for example, by employing 90% of the theoretical amount of the precipitating agent necessary to convert the salt into the corresponding oxide.

Following the treatment with the precipitating agent, the product is thoroughly washed to remove all reaction impurities such as alkali salts formed from the sodium silicate or impurities from other sources. During the washing treatment it is preferred to employ alkaline wash water during the main portion of the treatment, followed by acid washing during the final stages of the washing treatment. For example, under normal conditions about 45 hours may be required to complete the washing. During the first half of the period or first 23 hours of operation, the product may be washed with an alkaline water having a pH value of about 8, followed by washing during the last 22 hours with water having a pH value of about 4. Under the above conditions a gel product having an apparent density of about 0.65 may be obtained. The apparent density as herein employed means the weight in grams per cubic centimeter of $\frac{3}{16}''$ diameter pills activated for 3 hours at 1000° F. Following the washing treatment, the product is slowly dried to remove the bulk of the water at temperatures preferably above the boiling point of water. Following the drying operation the product may be activated by maintaining it at a temperature of from 800° F. to 1200° F. for several hours. The resulting product may be employed either in powder form or in the form of granules, or it may be molded into units of uniform size.

Instead of treating the hydrogel immediately after setting with a precipitating agent, as above described, the jelly product may be first dried before being treated with the precipitating agent and the resulting dried product then washed free of reaction impurities as previously described, or the hydrogel may be treated with a precipitating agent, as first described, followed by drying, after which the dried product may be washed to remove the reaction impurities. In most cases the resulting product is found to have a relatively high level of activity for cracking of hydrocarbon oils and the activity of the products produced from different batches may be maintained uniform.

The following examples may be helpful to a better understanding of the invention, it being understood that the values and conditions given therein are illustrative rather than limitative:

Example 1

10 liters of 25° Baumé commercial waterglass solution are first reacted with 10 liters of sulfuric acid solution containing 93 cc. of concentrated sulfuric acid per liter. The reaction is carried out by bringing the two small streams of sodium silicate and sulfuric acid together simultaneously. Under the above conditions, a clear hydrosol is formed, to which 3 liters of a solution containing 595 gms. per liter of iron-free hydrated commercial aluminum sulfate having an approximate formula of $Al_2(SO_4)_3.15H_2O$ are added. The resulting mixture is then heated to about 150° F. and allowed to stand for a period of about 1 to 2 hours until the solution has been completely converted into a hydrogel. The resulting product is then broken up into coarse lumps and soaked in a solution containing 11 liters of ammonium hydroxide solution containing 162 cubic centimeters per liter of concentrated ammonium hydroxide. The product is allowed to soak in the ammonium hydroxide solution until the reaction is completed, after which it is drained and then washed for a period of about 23 hours with an alkaline wash water having a pH value of about 8. Following this, the washing is continued employing an acid solution having a pH value of about 4 for a period of about 22 hours.

After the washing treatment, the product is dried for an extended period at a temperature of about 200° F. until the product contains about 10% moisture. A portion of the product so obtained was then activated at a temperature of about 850° F. for several hours and another portion was activated at a temperature of about 1400° F. for several hours. These products in molded state were then tested to determine their catalytic activity by passing an East Texas gas oil having an A. P. I. gravity of about 33.8° through the catalyst mass at a rate of about 0.6 v./v./hr. and maintaining the catalyst mass at a temperature of about 850° F. The length of the cracking cycle was two hours. Under these conditions the products activated at 850° F. produced about 60.5% of gasoline. The products activated at 1400° F. produced about 56.5% of gasoline. It will thus be seen that the catalyst has an extremely high order of activity even when heated to high temperatures, such as 1400° F.

Example 2

A silica hydrosol was first formed by reacting 10 liters of 25° Baumé waterglass solution with 6 liters of sulfuric acid solution containing about 125 cc. of concentrated sulfuric acid per liter in the manner described in Example 1. To the resulting solution 3 liters of aluminum sulfate solution of the same composition described in Example 1 were added. This product was allowed to set into a hydrogel. The resulting product was then partially dried to about 50% moisture content and then soaked in a solution containing 9 liters of ammonium hydroxide solution employing 97 cc. of concentrated ammonium hydroxide per liter of solution. After thorough soaking the product was drained and then thoroughly washed, as described in Example 1. The resulting product was then activated at a temperature of 850° F. and the cracking activity thereof tested under the conditions outlined in Example 1. Under these conditions a gasoline yield of 55% was obtained. The resulting gel had an apparent density of .688.

*Example 3*

Another catalyst was prepared in the same manner as outlined in Example 2, except that the hydrogel was first soaked in the ammonium hydroxide solution before the drying treatment and the soaked product was then partly dried or to ⅙ the volume of the hydrogel before being washed. A portion of the resulting product was activated at a temperature of 1000° F. and another portion at a temperature of 1400° F. The product activated at 1000° F. had an apparent density of .799 and the product activated at 1400° F. had an apparent density of .846. These products when tested for cracking activity as outlined in Example 1 resulted in gasoline conversions of 56.0 and 51.0, respectively.

*Example 4*

A catalyst was prepared using the proportions of the reagents outlined in Example 2. The impregnated hydrosol was allowed to set at 150° F. and thereafter soaked in ammonia, washed and dried as outlined in Example 1. This product was activated at a temperature of 1000° F. The activated product tested under the conditions described in Example 1 resulted in about 62% gasoline.

From the above examples, it will be noted that in each case an aluminum salt solution was combined after the formation of the silica hydrosol and before the sol was permitted to set into the hydrogel. It will also be noted that in each case a catalyst of extremely high activity was obtained. It has also been found that catalysts of uniformly high activity may be prepared according to the procedures outlined in the above examples.

While the invention has been described with specific reference to the preparation of silica-alumina gel adapted for the catalytic cracking and conversion of hydrocarbon oils, it also finds application in the preparation of other composite gels containing metallic oxides. The catalyst may contain other ingredients than silica and alumina but these ingredients may be added at the time the solution is added to the silica hydrosol or may be added in some subsequent stage in the preparation of the gel. Also, in some cases the additional ingredients, such as accelerators or promoters, may be added during the formation of the silica hydrosol and before the addition of the aluminum salt solution thereto. In general, however, it is preferred to avoid the presence of amphoteric metal salts during the formation of the hydrosol in order to remove the possibility of base exchange synthetic compounds being formed during the reaction of the acid with the alkali metal silicate.

In all the examples given the catalyst on a dry basis contains about 10 to 12.5% aluminum oxide, the remainder silica. Catalysts of higher or lower aluminum oxide contents may readily be obtained as by changing the concentration of the aluminum salts used for impregnating the hydrosol.

Other precipitating agents than ammonium hydroxide may be used; for example, ammonium carbonate, ammonium sulphide and certain of the amines. Also the hydroxides, carbonates and bicarbonates of the alkali metals might be used, but are not recommended because they introduce impurities which must subsequently be removed. Also other aluminum salts than the sulphate may be used, for example, aluminum nitrate, aluminum chloride, etc. I prefer to use aluminum sulphate because it is more economical.

Having described the preferred embodiment of the invention, it will be understood that it embraces such other variations and modifications as come within the spirit and scope thereof.

What is desired to be protected by Letters Patent is:

1. Method of preparing silica gels containing a metallic oxide and adapted for use in the conversion of hydrocarbon oils at elevated temperatures, which comprises forming a silica hydrosol, impregnating the hydrosol so formed with a solution of a metallic salt, thereafter converting the hydrosol to a hydrogel while the metallic salt remains as such therein, and thereafter decomposing the metallic salt into the corresponding oxide.

2. Method according to claim 1, in which the hydrogel containing said oxide is washed to remove the reaction impurities, and the resulting product is dried.

3. Method according to claim 1, in which the hydrogel containing such metallic salt is dried prior to decomposition of the salt, the dried gel is then treated to decompose the metallic salt into the oxide, and the resulting product is washed to remove the reaction impurities therefrom.

4. Method according to claim 1, in which the metallic salt is decomposed, the resulting product is dried and then washed.

5. Method of preparing silica-alumina gels adapted for use in the conversion of hydrocarbon oils at elevated temperatures, which comprises forming a silica hydrosol, impregnating the hydrosol so formed with a solution of an aluminum salt, thereafter converting the hydrosol into a hydrogel while the aluminum salt remains as such therein, and thereafter decomposing the aluminum salt into aluminum oxide.

6. Method for the conversion of hydrocarbon oils, which comprises passing the oil through a zone containing a catalyst comprising silica gel and a metallic oxide, said catalyst being prepared by first forming a silica hydrosol, impregnating said hydrosol with a solution of a metallic salt capable of being converted into a component of an active cracking catalyst, thereafter converting said hydrosol into a hydrogel while the metallic salt remains as such therein, decomposing the metallic salt into the oxide, maintaining said zone at active conversion temperature, and keeping the oil in contact with the catalyst within said zone for a period sufficient to obtain the desired conversion.

7. Method for cracking hydrocarbon oils, which comprises passing the oil through a cracking zone containing a catalyst comprising silica gel and alumina, said catalyst being prepared by first forming a silica hydrosol, impregnating said hydrosol with a solution of an aluminum salt, thereafter converting the hydrosol into a hydrogel while the aluminum salt remains as such therein, decomposing the aluminum salt into aluminum oxide, and maintaining the oil in contact with the catalyst while at cracking temperature for a period sufficient to obtain the desired cracking.

GERALD C. CONNOLLY.